Figure 1:
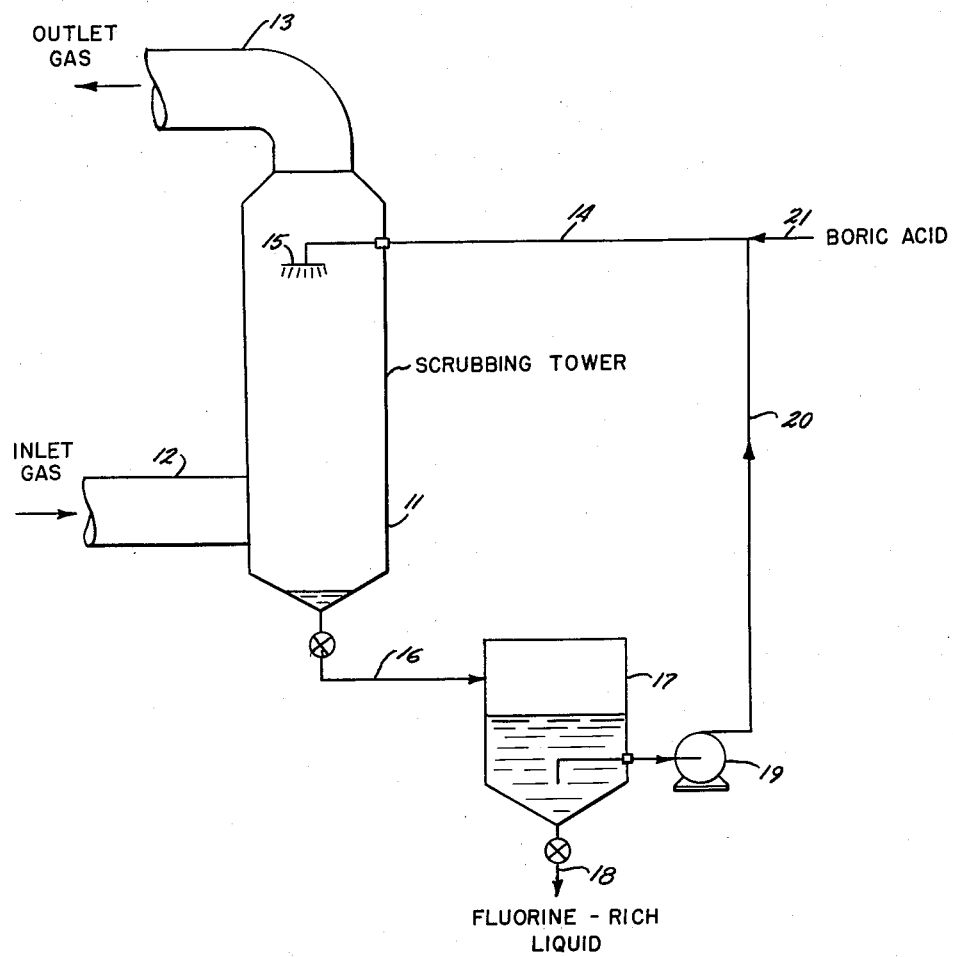

Jan. 9, 1962  A. F. CLIFFORD  3,016,285
METHOD OF SELECTIVELY ABSORBING HYDROGEN FLUORIDE FROM
GASES CONTAINING HYDROGEN FLUORIDE AND SULFUR DIOXIDE
Filed July 23, 1958  2 Sheets-Sheet 2

INVENTOR.
ALAN F. CLIFFORD
BY
*F.C. Wellington*
ATTORNEY.

3,016,285
METHOD OF SELECTIVELY ABSORBING HYDROGEN FLUORIDE FROM GASES CONTAINING HYDROGEN FLUORIDE AND SULFUR DIOXIDE
Alan F. Clifford, Lafayette, Ind., assignor to Monsanto Chemical Company, St. Louis, Mo., a corporation of Delaware
Filed July 23, 1958, Ser. No. 750,522
5 Claims. (Cl. 23—2)

The present invention relates to the recovery of fluorine. More particularly, the invention relates to a process for selectively removing hydrogen fluoride from gas streams containing such fluoride and sulfur dioxide.

The problem of removing fluorine and fluorine compounds such as hydrogen fluoride from gases containing such compounds is a very old problem to which numerous answers have been proposed. One particularly effective method for removing or recovering hydrogen fluoride from gases is by absorption of the hydrogen fluoride into a weak boric acid solution. This has been found to give substantially quantitative recovery of hydrogen fluoride from the gases.

In many instances, however, the gases (from which hydrogen fluoride is to be removed) also contain significant quantities of sulfur dioxide. A typical example of such a situation is found in conjunction with some processes for producing elemental phosphorus—particularly where phosphate ores containing fluorine are heated at elevated temperatures (as in a sintering or nodulizing process) prior to reduction in an electric-arc furnace. The off-gases from such ore processing operations will generally contain, in addition to the fluorides released from the phosphate ore, appreciable proportions of sulfur dioxide resulting from the sulfur content of the fuel used in the heating operation.

As might be expected, weak boric acid solutions will give relatively effective removal of hydrogen fluoride from such gases. However, such boric acid solutions also remove appreciable proportions of the sulfur dioxide from such gases. For many purposes (for example, where the absorbent solutions are to be further treated to recover fluorine values therefrom) the presence of appreciable amounts of sulfur dioxide in the absorbent solution is objectionable. Consequently, it is an object of the present invention to provide a method for a selectively removing the hydrogen fluoride from such gases without appreciable removal of sulfur dioxide.

In its most general aspects the present invention involves the selective absorption of hydrogen fluoride from gaseous mixtures containing both hydrogen fluoride and sulfur dioxide by contacting such gaseous mixtures with boric acid solutions containing relatively high concentrations (e.g., greater than 1 weight percent) of fluoboric acid. Such contacting of gases and liquid solutions can be carried out by spraying the liquid into the gases, or by other conventional liquid-gas contacting means such as bubble tray towers, or packed towers utilizing rings, saddles, helices or the like. For a more detailed description of the invention reference may be had to the accompanying drawings.

FIGURE 1 represents a specific embodiment of the invention comprising a scrubbing tower 11, into which inlet gases (containing both hydrogen fluoride and sulfur dioxide) are introduced through conduit 12, and from which the outlet gases (substantially free of hydrogen fluoride) are withdrawn through over-head conduit 13. In this scrubbing tower the gases are contacted with liquid absorbent introduced through line 14 and sprayed through nozzle 15. The absorbent is an aqueous boric acid solution containing fluoboric acid (HBF$_4$) in a concentration specified in more detail hereinbelow. This solution, which absorbs most of the hydrogen fluoride but only relatively small amounts of sulfur dioxide, is withdrawn from the scrubbing tower through line 16 and is passed to the hold tank 17. In the absorbent solution the hydrogen fluoride reacts with boric acid to form fluoboric acid, thereby increasing the fluoboric acid concentration and decreasing the boric acid concentration. While the exact course of this reaction is not known with certainty, it can probably be considered as taking place according to the following equation:

$$4HF + H_3BO_3 \rightarrow HBF_4 + 3H_2O$$

A portion of the fluorine-rich absorbent is withdrawn through line 18 for further processing to recover the fluorine values therefrom. The remainder of the fluorine-rich liquid is recirculated by pump 19 through line 20, fortified with additional boric acid introduced through line 21 and recirculated through line 14 back into the scrubbing tower.

It will generally be most convenient and most satisfactory to operate the present process on a continuous steady-state basis, withdrawing from the process the fluorine-rich absorbent liquid at a rate such that fluorine is withdrawn from the recirculating absorbent stream at the same rate as fluorine is removed from the gases, while adding fresh boric acid at a rate equivalent to that at which boron (as fluoborate ion) is removed from the recycle system. It should be readily apparent, however, that a continuous steady-state operation is not necessary to successful utilization of the invention. Thus, the boric acid may be added intermittently, with resultant fluctuations in boric acid concentration. Likewise, the resulting aqueous absorbent solution may be withdrawn intermittently, with resultant fluctuation in fluorine concentration of the recirculating liquid.

The essential characteristic of the present process is that the absorbent solution contain at least a minimum required concentration of the boric acid and the fluoboric acid. The concentration of boric acid should be at least about 0.01 weight percent, and preferably above about 0.1 weight percent. The fluoboric acid concentration should be above about 1 weight percent, and preferably above about 10 weight percent.

It will be readily apparent that instead of spraying the absorbent liquid into the gas stream, as illustrated in FIGURE 1, the gas can be bubbled or otherwise passed through a body of the absorbent liquid in which the minimum required concentrations of boric acid and fluoboric acid are maintained by suitable rates of addition of boric acid to the absorbent solution. Such rate of addition will be roughly equivalent (on a stoichiometric basis) to the rate of absorption of hydrogen fluoride from the gas stream. The fluorine-rich absorbent solution can then be removed either intermittently or continuously from the absorption zone, but the average rate of removal should be such that the boron removed (as fluoboric acid and/or boric acid) is not significantly greater than boron added (as boric acid) to such zone. When using this latter variation it will be apparent that the recycle feature described in the embodiment of FIGURE 1 will not be necessary. Such recycle, however, does have the practical advantage of being a simple and easy way for admixing and uniformly distributing fresh boric acid through the aqueous boric/fluoboric acid absorption solution.

Further details and advantages of the practice of the present invention will be apparent from the following examples. Example 1 demonstrates the lack of selectivity (between absorption of hydrogen fluoride and absorption of sulfur dioxide) obtained with the weak boric acid solutions previously used (in the absence of sulfur dioxide)

to quantitatively absorb gaseous hydrogen fluoride. In contrast thereto, Example 2 illustrates a typical preferred embodiment of the present invention in which hydrogen fluoride is selectively absorbed into a recirculating solution containing (in addition to boric acid) a high concentration of fluoboric acid.

*Example 1*

A typical nodulizing kiln gas containing about 0.2 volume percent of sulfur dioxide and about 0.3 volume percent of hydrogen fluoride (dry gas basis) was contacted with a 0.01 molar (about 0.06 weight percent) aqueous boric acid solution in an amount sufficient to remove most (better than 92 percent) of the hydrogen fluoride from the gas. The resulting fluorine-rich solution was found to contain sulfur dioxide in an amount such that the weight ratio of fluorine to sulfur dioxide was about 4.

*Example 2*

Nodulizing kiln gases of the same composition utilized in Example 1 were continuously introduced at 400° C. into a scrubbing tower in which they were contacted with an aqueous solution of boric acid and fluoboric acid sprayed into the tower at 78° C. at a rate of about 10 pounds of scrubbing solution per 100 dry standard cubic feet of kiln gases. The scrubbing solution withdrawn from the bottom of the tower contained about 28 weight percent of fluoboric acid and about 0.12 weight percent of sulfur dioxide, remainder water. About 0.84 weight percent of this solution was withdrawn from the process and the remainder was continuously fortified with fresh boric acid (0.63 weight percent aqueous solution added at a rate of about 2.1 pounds per 100 dry standard cubic feet of kiln gases) and recycled to the scrubbing tower. The fortified recycle solution analyzed about 0.01 weight percent sulfur dioxide, about 0.13 weight percent boric acid, about 22.17 weight percent fluoboric acid, and the remainder water. The foregoing process removed 92+ percent of the hydrogen fluoride from the gases while removing only 0.235 percent of the sulfur dioxide from the gases. The fluorine-rich liquid withdrawn from the process contained a weight ratio of fluorine to sulfur dioxide of about 196.

Absorption with the solutions of this invention containing high concentrations of fluoboric acid has the additional advantage, particularly with respect to use with such gases as result from a phosphate ore nodulizing or sintering process, that normally insoluble dusts washed from the gases are relatively readily dissolved in the strong fluoboric acid—thereby making the absorbent solutions easier to work with.

The foregoing description and examples have emphasized the factor of high selectivity in obtaining a liquid effluent stream having a high ratio of fluorine to sulfur dioxide. In some instances, however, it will be necessary or desirable to place additional emphasis upon the completeness of removal of hydrogen fluoride from the gases, an example of such an instance being where atmospheric pollution must be minimized. A further preferred embodiment of the present invention is particularly useful in such cases, in that it allows practically quantitative removal of hydrogen fluoride from the gases with only a very slight sacrifice in the desired selectivity between absorption of hydrogen fluoride and sulfur dioxide. This preferred embodiment involves taking the off-gases from an absorption zone as described above and further contacting such gases in a second absorption zone with a fresh boric acid solution, said solution preferably also containing fluoboric acid but in a lower concentration than was maintained in the first absorption zone. In a further preferred embodiment of the invention the effluent absorbent liquid from the second absorption zone is then introduced into the first absorption zone, thereby utilizing the excess boric acid flow from the second absorption zone as the source of boric acid feed for the first absorption zone.

Figure 2:
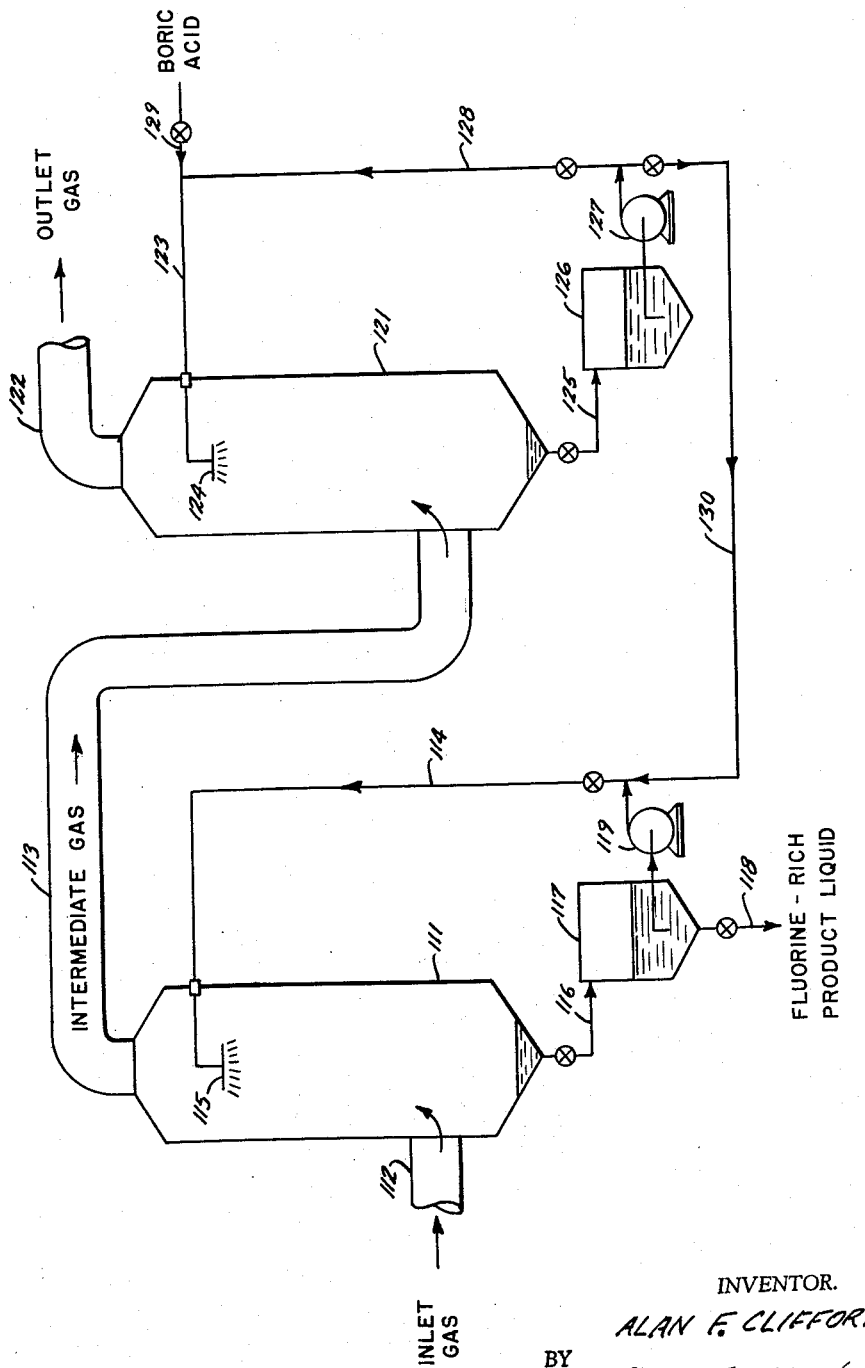

Such an embodiment is illustrated in FIGURE 2 of the drawings.

Referring to FIGURE 2, the inlet gases containing hydrogen fluoride and sulfur dioxide are introduced into a first scrubbing tower 111 through the gas inlet 112 and are withdrawn from the scrubbing tower through line 113. A boric acid solution containing the required concentration of fluoboric acid is introduced through line 114 and sprayed into the gas stream through nozzle 115, falling through the tower 111 in contact with the gases, and being collected in the bottom of the tower. This liquid is withdrawn from the tower through line 116 and introduced into hold tank 117, from which the fluorine rich liquid product is intermittently or continuously withdrawn through line 118. A portion of the liquid is withdrawn through pump 119 and recirculated through line 114 back into the scrubbing tower.

The intermediate gas stream withdrawn through line 113 from the first stage scrubbing tower 111 is then introduced into a second stage scrubbing tower 121 and withdrawn through gas outlet 122. There is continuously introduced through line 123 and nozzle 124 a scrubbing solution comprising an aqueous boric acid solution, which will also contain a relatively low concentration of fluoboric acid whenever absorbent solution is being re-cycled through line 128 as described below. The scrubbing solution passes downwardly through the scrubbing tower 121, is collected in the bottom thereof, and withdrawn through line 125 into hold tank 126. The solution is then withdrawn through pump 127 and is divided into two streams, one stream being recycled to the scrubbing tower through lines 128 and 123, the other stream being introduced through line 130 into the recycled absorption solution of the first stage scrubbing tower. Fresh boric acid is continuously or intermittently introduced through line 129 in order to supply sufficient boric acid to absorb and react with hydrogen fluoride passing into the second stage scrubbing tower and still leave a sufficient excess of boric acid to supply the first stage requirements for boric acid.

In the second stage of a two stage process such as described in FIGURE 2 the fluoboric acid concentration is preferably maintained relatively low, for example, between about 0.001 weight percent and about 1 weight percent, and preferably between about 0.01 and about 0.5 weight percent. The boric acid concentration in such second stage will generally range from about 0.1 weight percent and about 3 weight percent, and preferably between about 0.3 and about 3 weight percent.

Utilizing the embodiment of this invention illustrated in FIGURE 2 to scrub a nodulizing kiln gas of the composition described in Examples 1 and 2, it is possible to remove 99.25 percent of the hydrogen fluoride from such gases while only removing 1.79% of the sulfur dioxide.

The foregoing description of this invention has placed particular emphasis upon the processing of gases obtained from heating phosphate ores (which gases contain relatively small concentrations of hydrogen fluoride and sulfur dioxide). It should be readily apparent, however, that the process described herein is equally applicable (with minor variations apparent to those skilled in the art) to similar gases from other sources, or to other gases containing larger amounts of hydrogen fluoride and sulfur dioxide—and including mixtures consisting essentially of only hydrogen fluoride and sulfur dioxide.

What is claimed is:

1. A method for selectively absorbing hydrogen fluoride from a gaseous mixture containing hydrogen fluoride and sulfur dioxide, which method comprises passing said gaseous mixture through an absorption zone in contact with an aqueous solution of boric acid containing at least about 1 weight percent of fluoboric acid.

2. A method for selectively absorbing hydrogen fluoride from a gaseous mixture containing hydrogen fluoride and sulfur dioxide, which method comprises passing said gaseous mixture through an absorption zone in contact with an aqueous solution of boric acid containing at least about 1 weight percent of fluoboric acid, withdrawing the resulting solution from said absorption zone, separating said resulting solution into major and minor portions, adding boric acid to said major portion and thereafter returning said major portion of said solution to the aforesaid absorption zone for further contact with a gaseous mixture containing hydrogen fluoride and sulfur dioxide.

3. A method for selectively absorbing hyrogen fluoride from a gaseous mixture containing hydrogen fluoride and sulfur dioxide, which method comprises continuously passing said gaseous mixture through an absorption zone in contact with an aqueous solution of boric acid containing at least 10 weight percent of fluoboric acid, continuously withdrawing the resulting solution from said absorption zone, separating said solution into major and minor portions, adding boric acid to the major portion thereof and recirculating said major portion through the aforesaid absorption zone in further contact with a gaseous mixture of hydrogen fluoride and sulfur dioxide.

4. A method for selectively absorbing hydrogen fluoride from a gaseous mixture containing hydrogen fluoride and sulfur dioxide, which method comprises passing said gaseous mixture through an absorption zone in contact with an aqueous solution containing at least 0.01 weight percent of boric acid and at least 1 weight percent of fluoboric acid, continuously withdrawing the resulting solution from said absorption zone, separating said solution into major and minor portions, adding sufficient boric acid to said major portion to bring the boric acid concentration in said major portion up to the initial boric acid concentration in the aqueous absorption solution, and thereafter recirculating said major portion through the aforesaid absorption zone in further contact with a gaseous mixture of hydrogen fluoride and sulfur dioxide.

5. A method for selectively absorbing hydrogen fluoride from a gaseous mixture containing hydrogen fluoride and sulfur dioxide, which method comprises continuously passing said gaseous mixture into a first absorption zone in contact with an aqueous solution of boric acid containing at least about 1 weight percent of fluoboric acid, continuously withdrawing from said first absorption zone an aqueous product solution containing a substantial proportion of the fluoride originally present in the aforesaid gaseous mixture, also continuously withdrawing from said first absorption zone a gas from which most of the aforesaid hydrogen fluoride has been removed but in which most of the aforesaid sulfur dioxide still remains, continuously passing said latter gas into a second absorption zone in contact with an aqueous solution of boric acid containing at least about 1 weight percent of fluoboric acid, continuously introducing boric acid into said latter aqueous solution, withdrawing from said second absorption zone a gas substantially free from hydrogen fluoride but still containing most of the sulfur dioxide originally present in said gas, continuously withdrawing from said second absorption zone a solution of fluoboric acid and boric acid, and continuously introducing said solution into the aforesaid first absorption zone.

References Cited in the file of this patent

UNITED STATES PATENTS

| | | |
|---|---|---|
| 2,790,705 | Kean | Apr. 30, 1957 |
| 2,813,000 | Qittenton | Nov. 12, 1957 |

OTHER REFERENCES

Mellor's Comprehensive Treatise on Inorganic and Theoretical Chemistry, Suppl. II, Part I, Longmans, Green and Co., New York, 1956, page 132.